Sept. 30, 1952  E. B. GIBSON  2,611,988

SINKER FOR FISHING LINES

Filed Sept. 26, 1949

ELGEN B. GIBSON
INVENTOR.

BY Albert J. Fihe
ATTORNEY

Patented Sept. 30, 1952

2,611,988

UNITED STATES PATENT OFFICE 2,611,988

SINKER FOR FISHING LINES

Elgen B. Gibson, Burbank, Calif.

Application September 26, 1949, Serial No. 117,823

1 Claim. (Cl. 43—44.96)

This invention relates to an improved sinker for fishing lines and has for one of its principal objects the provision of a sinker which is particularly adaptable for that type of fishing which is known as "surf casting."

In this particular embodiment of the sport, the bait which attracts the fish and which is on suitable hooks, is designed to be cast into the ocean to a considerable distance from the shore, preferably at a point beyond the breakers. Even when this has been accomplished, the action of the waves and breakers will usually have a tendency to wash the bait, hooks and sinker back toward the shore and as the fish ordinarily feed at points outside the breakers, the possibilities of a successful catch are, therefore, considerably reduced.

One of the objects of this invention is to provide a sinker for fishing lines which, when used in connection with surf casting will act to automatically embed itself in the bottom of the ocean at the point where it lodges after being cast, whereby the bait will be held in desired position for attracting larger numbers of fish.

Another object of the invention is the provision in a sinker for fishing lines, which, while acting to automatically embed or anchor itself in the ocean bed after being cast, is so designed that when a fish is caught, or if for any other reason the fisherman desires to retrieve the bait, line and sinker, the sinker can be easily dislodged from its anchored position by a simple pull on the line and readily brought into shore.

Another and still further important object of the invention is to provide in a sinker for fishing lines means for fastening the line, leader and hooks in either one or two positions so that a fishing procedure may be varied when desired in order to accommodate itself to different conditions.

Other and further important objects of the invention will be apparent from the disclosures in the accompanying drawings and following specification.

The invention, in a preferred form, is illustrated in the drawings and hereinafter more fully described.

Figure 1:
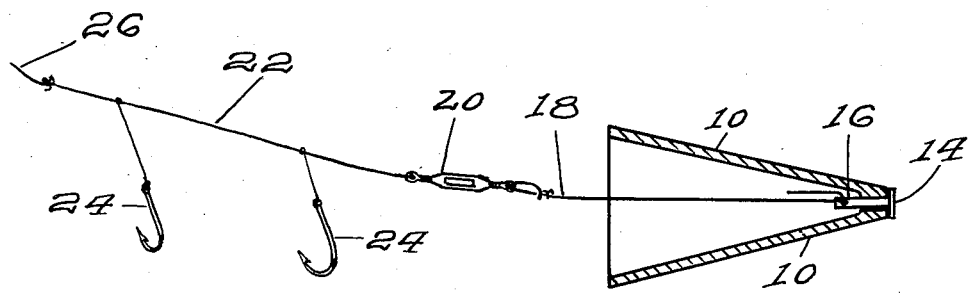
Figure 1 is a side elevation, parts being shown in section, of the improved fishing line sinker of this invention and showing the same with a leader, hooks and swivel attached.

The reference numeral 10 indicates generally the improved sinker of this invention, the same being preferably in the form of a hollow pyramid having four sides and of square cross section. Obviously, other contours and shapes may be used, for example, the same may be conical or it may be triangular in cross section or even have more sides, such as pentagonal or hexagonal cross section.

The size, weight and wall thickness of the sinker can be varied to a considerable range depending upon the particular use or uses to which it is to be put.

The sinker is provided with an opening adjacent its narrow end, the opening being illustrated at 12, and into this opening is slidably fitted a plug 14 which comprises a head, as shown in Figure 1, and a shaft or rod portion 16. The inner end of the rod is pierced for the reception of an attaching wire or similar connecting element 18. The wire 18 is removably attached at one end to plug 14 in such a manner as to prevent plug 14 from slipping out of the opening 12.

In one embodiment of use a swivel 20 is attached to the other end of the wire 18 and then a leader 22 is fastened to the other end of the swivel. One or more hooks 24 are affixed to the leader 22 in the usual fashion and the other end of the leader is then connected to the usual line 26.

Figure 3:
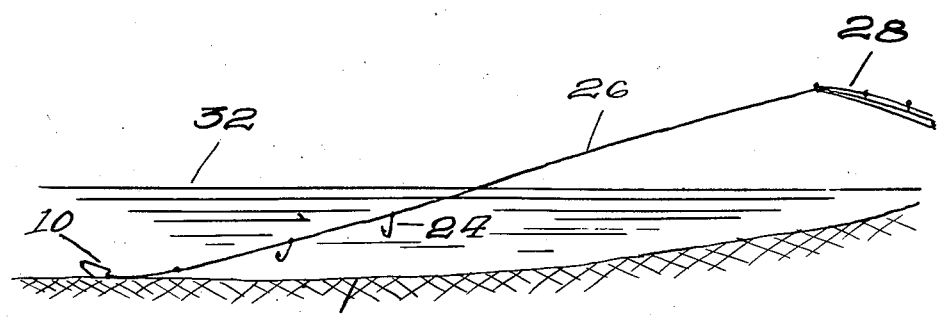
Figure 3 illustrates the action of the sinker on the ocean bed.

As shown in Figure 3, the entire element is attached to a rod 28 and after the cast has been accomplished the sinker 10 lodges on the bottom 30 of the body of water 32 and any tendency of the waves to wash the same in toward the shore will tilt and direct the sinker, as shown in Figure 3, whereby further washing action of the waves or any slight pull on the line will cause the same to dig into the bottom 30, thereby providing an automatic anchoring effect.

Figure 4:
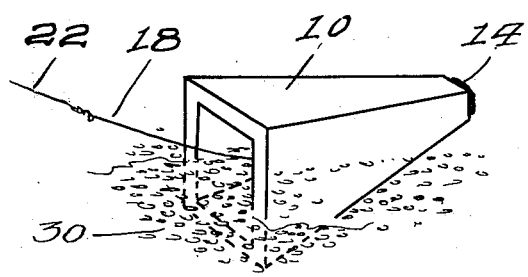
Figure 4 is a detail perspective view showing the anchoring and settling action of the sinker after being cast.

As best shown in Figure 4, the digging or anchoring operation proceeds to the point where a considerable portion of the sinker is under the bottom of the ocean bed and any further washing action of the waves will not have much effect.

However, a pull on the line will readily dislodge the sinker, because such a pull will have a tendency to up-end the same with the narrow portion turning over, whereby the hollow portion of the sinker will be automatically emptied and the same can then be easily drawn into shore without too much difficulty.

Figure 2:
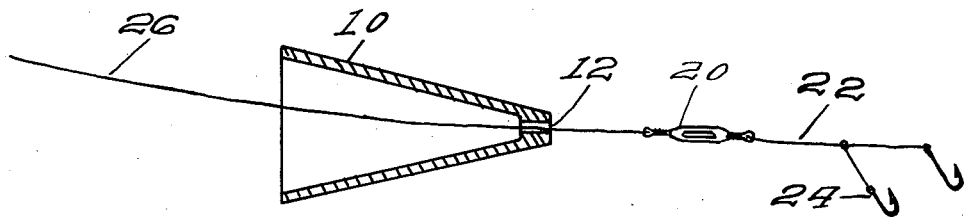
Figure 2 is a view showing the sinker as used in a different relationship to the hooks and swivel and with one part removed.

Another embodiment of the invention is shown in Figure 2, wherein the plug 14—16 has been removed from the opening 12 and the line 26 is pierced through the opening with the swivel 20 beyond the sinker and the leader 22 with the hooks 24 beyond the swivel.

In this embodiment, the anchor action is substantially the same, but when a fish takes the bait the line is permitted to run out through the hole 12 in the sinker without, at the moment, dislodging the same, thereby giving the fisherman an opportunity to play the fish. Any upward movement on the part of the fish will tend to up-end the sinker, thereby embodying the same, whereupon the playing of the fish and drawing in of the line and sinker toward the shore will be concurrent and simultaneous in operation.

It will be evident that herein is provided a sinker for fishing lines which is particularly adapted for that type of ocean fishing known as surf casting, but which obviously can be used in other environments.

The removal of the plug with its attaching wire is simply and easily accomplished whenever it is desired to have the line drawn freely through the sinker and the replacement of this plug is just as simple.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A surf casting sinker for fishing line comprising a hollow metal pyramid having an opening in its apex, a plug in said opening, the plug having a circular head and shank and being T-shaped in longitudinal cross-section, the surface area of the circular T-head of the plug being approximately equal to the surface area of the apex of the pyramid, said plug being removably and slidably mounted in the opening, a wire removably mounted in the inner end of the plug in such a manner as to prevent the plug from slipping out of the opening, the other end of the wire passing through the hollow portion of the pyramid and projecting beyond the base thereof, and means for attaching a line, leader and hooks to said projecting end of the wire, the removal of said plug allowing of the free passage of the fishing line through the opening in the sinker whereby a leader and hooks can be attached to the end of the line and beyond the apex of the pyramid.

ELGEN B. GIBSON.

REFERENCES CITED

The following references are of record in the file of this patent:

UNITED STATES PATENTS

| Number | Name | Date |
|---|---|---|
| 591,159 | Crocker | Oct. 5, 1897 |
| 788,369 | O'Neill | Apr. 25, 1905 |
| 1,544,129 | Burt | June 30, 1925 |
| 2,033,683 | Clark | Mar. 10, 1936 |
| 2,140,724 | Stefan | Dec. 20, 1938 |
| 2,162,821 | Parmenter | June 20, 1939 |
| 2,316,074 | Kimbrough | Apr. 6, 1943 |
| 2,399,371 | Mendelson | Apr. 30, 1946 |